United States Patent
Gavai et al.

(10) Patent No.: US 11,521,611 B2
(45) Date of Patent: Dec. 6, 2022

(54) USING CONVERSATION STRUCTURE AND CONTENT TO ANSWER QUESTIONS IN MULTI-PART ONLINE INTERACTIONS

(71) Applicant: Palo Alto Research Center Incorporated, Palo Alto, CA (US)

(72) Inventors: Gaurang Gavai, San Francisco, CA (US); Varnith Chordia, Sunnyvale, CA (US); Kyle Dent, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 473 days.

(21) Appl. No.: 16/720,654

(22) Filed: Dec. 19, 2019

(65) Prior Publication Data

US 2021/0193135 A1 Jun. 24, 2021

(51) Int. Cl.
*G10L 15/22* (2006.01)
*G06F 16/332* (2019.01)
*G06F 16/33* (2019.01)
*G10L 15/06* (2013.01)
*G10L 15/18* (2013.01)
*G06F 40/279* (2020.01)
*G06F 40/56* (2020.01)
*G06F 40/30* (2020.01)
*G06F 40/205* (2020.01)

(52) U.S. Cl.
CPC .......... *G10L 15/22* (2013.01); *G06F 16/3329* (2019.01); *G06F 16/3344* (2019.01); *G10L 15/063* (2013.01); *G10L 15/1815* (2013.01); *G10L 15/1822* (2013.01); *G06F 40/205* (2020.01); *G06F 40/279* (2020.01); *G06F 40/30* (2020.01); *G06F 40/56* (2020.01); *G10L 2015/223* (2013.01)

(58) Field of Classification Search
CPC ............... G10L 15/063; G10L 15/1815; G10L 15/1822; G10L 15/22; G10L 2015/223; G06F 16/3329; G06F 16/3344; G06F 16/90332; G06F 40/205; G06F 40/289; G06F 40/30; G06F 40/56; G06F 40/279
See application file for complete search history.

(56) References Cited

U.S. PATENT DOCUMENTS

| 10,417,266 | B2 | 9/2019 | Patel et al. | |
|---|---|---|---|---|
| 2007/0294229 | A1* | 12/2007 | Au | G06F 16/951 |
| 2009/0119371 | A1* | 5/2009 | Chang | H04L 12/1827 |
| | | | | 709/206 |
| 2013/0007037 | A1* | 1/2013 | Azzam | G06F 16/3329 |
| | | | | 707/769 |
| 2017/0180294 | A1 | 6/2017 | Milligan et al. | |

(Continued)

OTHER PUBLICATIONS

Extended European Search Report from EP Application No. 20211383.3 dated Apr. 6, 2021, 8 pages.

*Primary Examiner* — Eric Yen
(74) *Attorney, Agent, or Firm* — Mueting Raasch Group (57) ABSTRACT

A computer-implemented method for determining an answer to a question in a multi-party conversation includes receiving a multi-party conversation having multiple nodes of unstructured natural language. Each node is parsed into a plurality of elements. Each element of the plurality of elements that comprises a question is identified. A conversation node list is constructed that identifies relationships between the nodes. At least one answer to the question is produced based on the conversation node list.

20 Claims, 6 Drawing Sheets

(56) References Cited

U.S. PATENT DOCUMENTS

| | | |
|---|---|---|
| 2018/0096322 A1* | 4/2018 | D'Agostino ........ G06F 16/2425 |
| 2018/0150747 A1* | 5/2018 | Bastide ............... G06F 16/3329 |
| 2018/0329879 A1 | 11/2018 | Galitsky |
| 2018/0357221 A1 | 12/2018 | Galitsky |
| 2019/0179903 A1 | 6/2019 | Terry et al. |
| 2019/0236085 A1 | 8/2019 | Galitsky |
| 2019/0333518 A1* | 10/2019 | Jones ..................... G10L 15/22 |
| 2019/0341036 A1 | 11/2019 | Zhang et al. |
| 2020/0285810 A1* | 9/2020 | Di Rosa ................... G06N 5/04 |

\* cited by examiner

USING CONVERSATION STRUCTURE AND CONTENT TO ANSWER QUESTIONS IN MULTI-PART ONLINE INTERACTIONS

TECHNICAL FIELD

The present disclosure is directed to language processing in online conversations.

BACKGROUND

The structure and content of multi-party online conversations may be used by machine learning techniques to find the answer to a question posed by a participant within the conversation.

SUMMARY

Embodiments described herein involve a computer-implemented method for determining an answer to a question in a multi-party conversation. A multi-party conversation comprising multiple nodes of unstructured natural language is received. Each node is parsed into a plurality of elements. Each element of the plurality of elements that comprises a question is identified. A conversation node list is constructed that identifies relationships between the nodes. At least one answer to the question is produced based on the conversation node list.

A system for determining an answer to a question in a multi-party conversation comprises a processor and a memory storing computer program instructions which when executed by the processor cause the processor to perform operations. A multi-party conversation comprising multiple nodes of unstructured natural language is received. Each node is parsed into a plurality of elements. Each element of the plurality of elements that comprises a question is identified. A conversation node list is constructed that identifies relationships between the nodes. At least one answer to the question is produced based on the conversation node list.

Embodiments involve a non-transitory computer readable medium storing computer program instructions for determining an answer to a question in a multi-party conversation, the computer program instructions when executed by a processor cause the processor to perform operations. A multi-party conversation comprising multiple nodes of unstructured natural language is received. Each node is parsed into a plurality of elements. Each element of the plurality of elements that comprises a question is identified. A conversation node list is constructed that identifies relationships between the nodes. At least one answer to the question is produced based on the conversation node list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to using the structure and content of multi-party online conversations to find the answer to a question posed by a participant within the conversation. Multi-party interactions are found online very commonly in the form of chat rooms, internet forums and most ubiquitously—emails. Embodiments described herein may use emails as an example of communication, but it is to be understood that the same and/or similar approaches can be applied can be applied to any multi-party online interaction. Conversation thread structures in such interactions may be used to allow users to ascertain a greater context to the messages they are reading. This structure can be extracted from email threads and/or other types of online communication to provide greater context for better question-answering.

There may be many difficulties in finding the answer to a question asked in such conversation thread. For example, the message directly after a question may not hold the answer as one may expect. A single conversation thread often contains multiple contextual streams or topics being discussed simultaneously, each that involves some subset of people contained within the thread. Myriads of issues complicate the disentangling of these topics. For example, the question asked may be directed to the wrong person, may be ignored initially, and/or may have a more complicated answer that only emerges through the conversation that follows. Using only contextual clues to try and resolve such situations often leads to incomplete or incorrect answers.

According to various embodiments, one can determine how to identify and then answer questions found within banks of text using machine learning techniques. This can be done using language models and/or deep learning algorithms that have been developed for the purposes of question answering. Language models such as BERT and GPT-2 have been used to provide results on such natural language processing tasks. These models have a deep sense of language context and flow and can answer questions found within single-author texts with high accuracy. Multiple deep learning models have been constructed that can identify and classify questions in text. Using a combination of these two types of models yields answers with high accuracy, Complications arise when text is taken from multi-party interactions (e.g., emails) as processing this type of language is very different to the kind that most language models are used to. The major difference arises from the nature of context within the text. Single author text is usually written for external consumption and thus usually has explicitly defined context to all information contained within it, Multi-party interactions like entails are inherently a medium of implicit context i.e. context is kept to a minimum and any pre-existing context between participants is often expressly not reiterated within a thread. This makes it hard for language models to apply their insights on context and flow to such interactions.

Embodiments described herein describe a way to untwine the contextual streams and connect the distributed context. This may be done by using the structure of the 'reply-to' relationships within the conversation thread to link subgraphs of nodes that have a high probability of being contextually linked. This structure may be used to rank the probability of all emails within a thread containing the answer to a previously asked question. Embodiments described herein reduce and/or streamline the possible answer space for the context-based question answering module, resulting in higher quality answers to questions.

Figure 1:
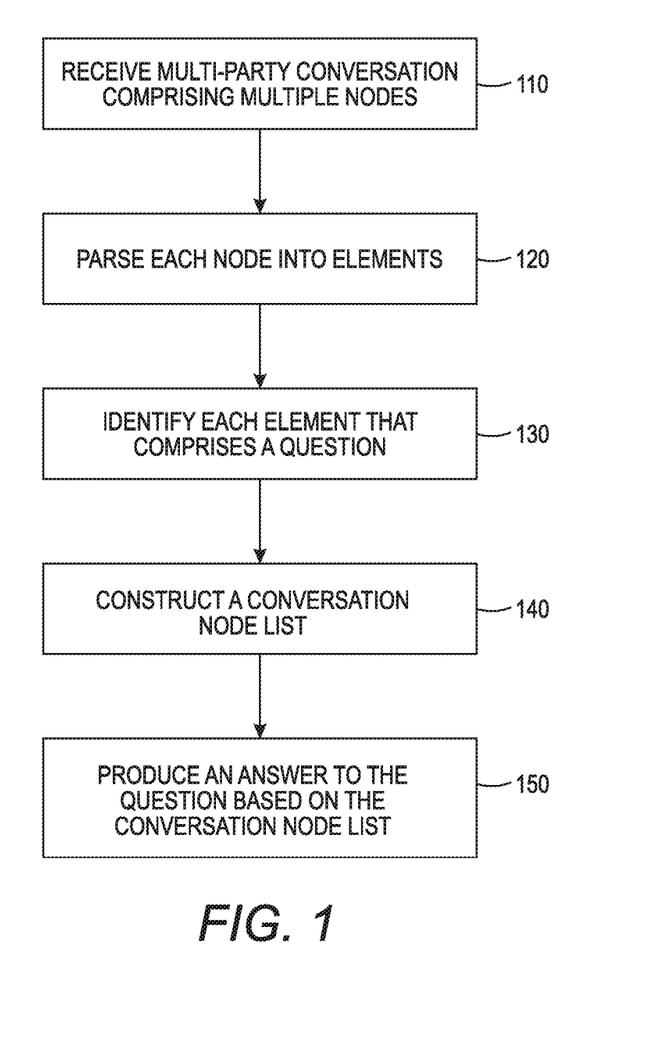
FIG. 1 shows a process for finding an answer to a question posed in a multi-party conversation in accordance with embodiments described herein.

FIG. 1 shows a process for finding an answer to a question posed in a multi-party conversation in accordance with embodiments described herein. A multi-party conversation comprising multiple nodes of unstructured natural language is received 110. Each node is parsed 120 into a plurality of elements. The elements may be any type of conversation element. For example, the element may comprise a sentence and/or a list item. Each element of the plurality of elements that comprises a question is identified 130. This may be done by identifying elements that contain a question mark, for example. A conversation node list that identifies relationships between the conversation elements is constructed 140. At least one answer to the question is produced 150 based on the conversation node list. According to various implementations, the at least one answer to the question is produced based on other contextual information surrounding the question.

Figure 2:
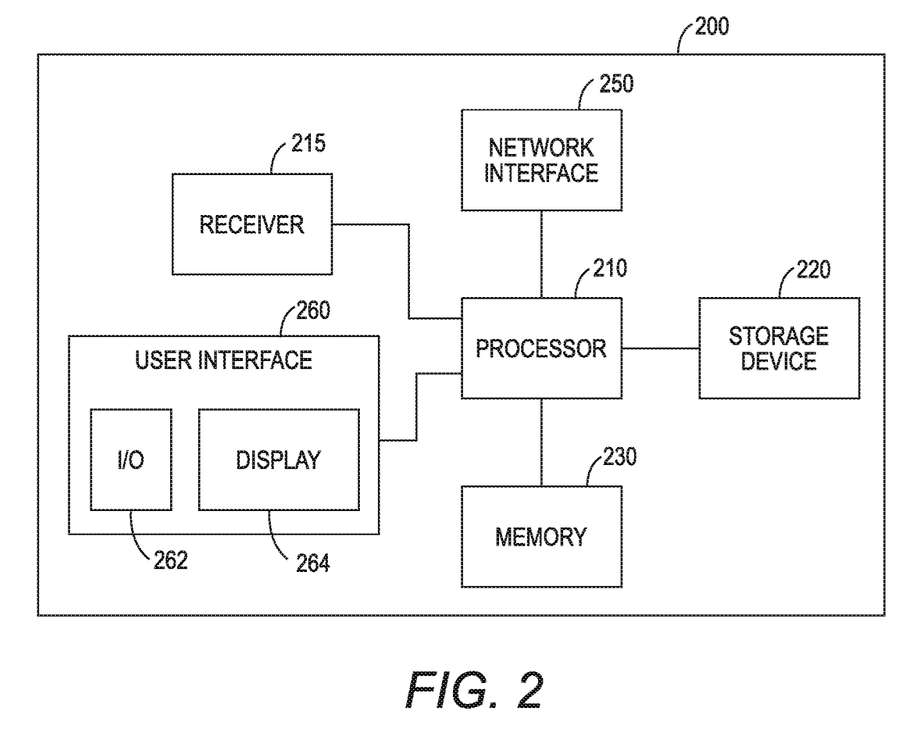
FIG. 2 shows a block diagram of a system capable of implementing embodiments described herein.

The methods described herein can be implemented on a computer using well-known computer processors, memory units, storage devices, computer software, and other components. A high-level block diagram of such a computer is illustrated in FIG. 2. Computer 200 contains a processor 210, which controls the overall operation of the computer 200 by executing computer program instructions which define such operation. The computer program instructions may be stored in a storage device 220 (e.g., magnetic disk) and loaded into memory 230 when execution of the computer program instructions is desired. Thus, the steps of the methods described herein may be defined by the computer program instructions stored in the memory 230 and controlled by the processor 210 executing the computer program instructions. The computer 200 may include one or more network interfaces 250 for communicating with other devices via a network. The computer 200 also includes a user interface 260 that enable user interaction with the computer 200. The user interface 260 may include I/O devices 262 (e.g., keyboard, mouse, speakers, buttons, etc.) to allow the user to interact with the computer. Such input/output devices 262 may be used in conjunction with a set of computer programs as an annotation tool to annotate training data in accordance with embodiments described herein. The user interface may include a display 264. The computer may also include a receiver 215 configured to receive data from the user interface 260 and/or from the storage device 220. According to various embodiments, FIG. 2 is a high-level representation of possible components of a computer for illustrative purposes and the computer may contain other components.

Figure 3:
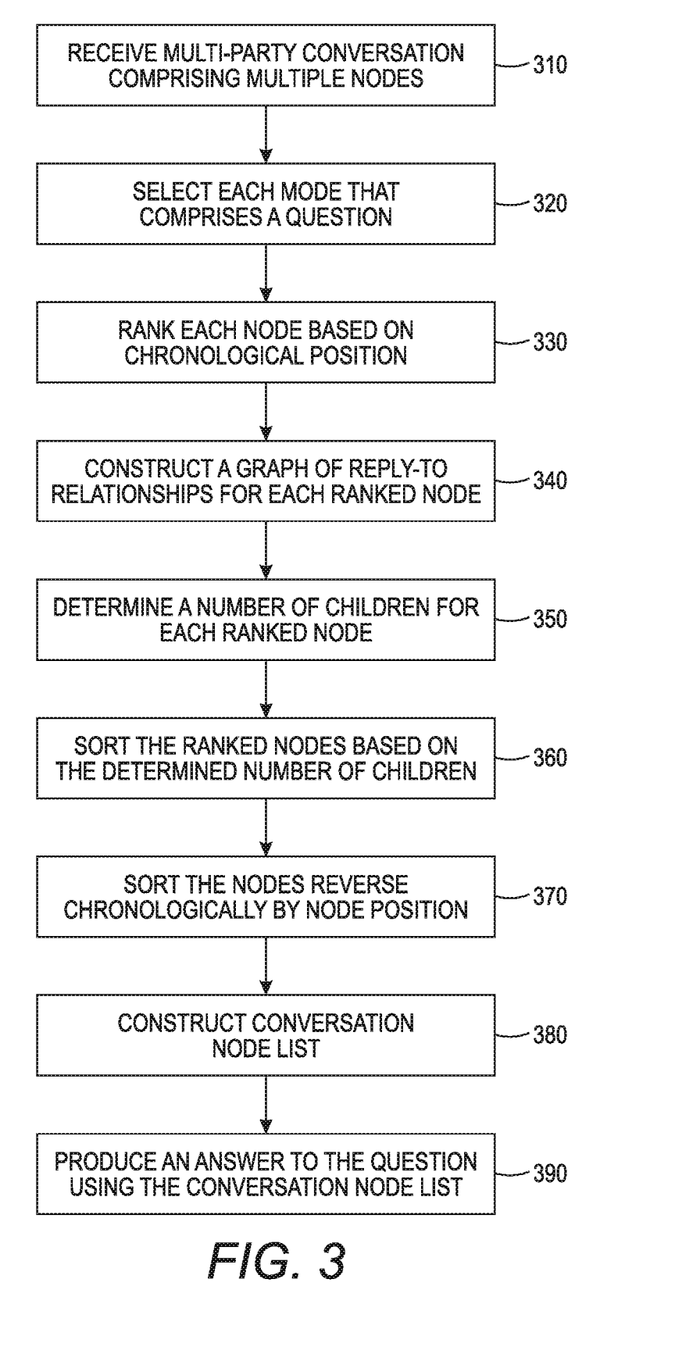
FIG. 3 shows a more detailed process that describes the construction of the conversation node list in accordance with embodiments described herein.

FIG. 3 shows a more detailed process that describes the construction of the conversation node list. A multi-party conversation comprising multiple nodes is received 310. Each node that comprises a question is selected 320 using the question identification process described in conjunction with FIG. 1, for example. Each node is ranked based on chronological position 330. A graph of reply-to relationships for each ranked node is constructed 340.

Figure 4:
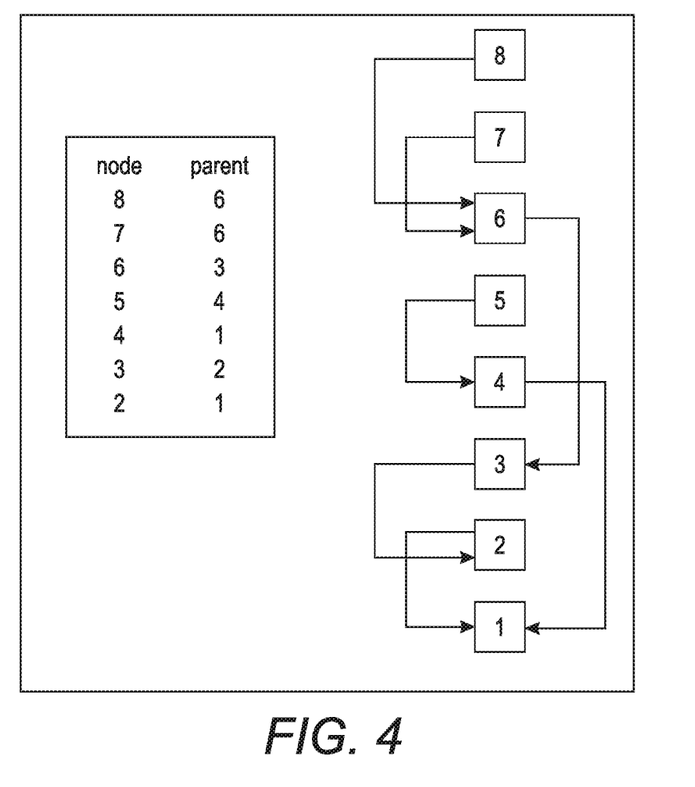
FIG. 4 illustrates an example graph showing a reply-to relationships in accordance with embodiments described herein.

An example email chain from the Enron email corpus dataset is shown below.
Email Number: 8
Sender ID: richard.shapiro@enron.com
Recipient ID: Paul Dawson/Enron@EUEnronXGate
Message: Feel free to proceed. Thanks.
Email Number: 7
Sender ID: Jeff Dasovich on Jun. 26, 2001 11:46 AM
Recipient ID: Paul Dawson/Enron@EUEnronXGate
Message: I'm comfortable, so long as Rick and Paul are as well. Best, Jeff
Email Number: 6
Sender ID: Paul Dawson/Enron@EUEnronXGate
Recipient ID: Paul Kaufman/ENRON@enronXgate, Jeff Dasovich/NA/Enron@Enron
Message: As Mark mentioned, I would recommend Edward Barker. He is closely involved in NETA and has a good understanding of power and gas markets. I also wouldn't be concerned about whether CA is relevant—it is a major issue here and on the Continent as the EU states begin to look at security of supply and how they can avoid "doing a California". Edward is sufficiently bright and discerning to recognise any evidence he picks up in CA for what it is. Based on the exchange of correspondence below, I will get back to Ian Fletcher and ask for Edward's CV etc and indicate that we would be prepared to consider a role in San Francisco (with some flexibility). Please confirm that you are happy for me to progress this further with the DTI. Thanks Paul
Email Number: 5
Sender ID: Schroeder, Mark
Recipient ID: Dawson, Paul
Message: Paul D.—fyi. You should also ask Ian for a copy of his CV. thanks mcs
Email Number: 4
Sender ID: Shapiro, Richard
Recipient ID: Schroeder, Mark
Message:
Email Number: 3
  Sender ID: Paul Kaufman/ENRON@enronXgate on Jun. 25, 2001 02:59 PM
Recipient ID: Richard Shapiro/NA/Enron@Enron, Jeff Dasovich/NA/Enron@Enron Message: I'd like to see his resume. I don't know that California work will be particularly informative—given the uniqueness of that great state, but we no doubt can find a use for his skills. I would want to see his CV. It would be a nonstarter for me if he was unwilling to travel to SFO or Portland on regular basis. However, the travel could be 3-4 days a week—i.e., he could travel up on Monday and go home on Thursday. (Or some other such schedule).
Email Number: 2
  Sender ID: Shapiro, Richard
Recipient ID: Dasovich, Jeff; Kaufman, Paul
Message: What do you think?
Email Number: 1
Sender ID: Mark Schroeder/ENRON@enronXgate on Jun. 25, 2001 01:22 PM
Recipient ID: Richard Shapiro/NA/Enron@Enron
Message: Rick—I just got a call from Ian Fletcher, head of the Utilities Regulation unit at the UK Department of Trade and Industry. He reports to Anna Walker, the Director General of Energy at the DTI. Ian also knows Paul, and I am sure that he only called me because he now knew of my US location. Anyway, here is what he asked: They have a highly regarded junior civil servant, Edward Barker (Paul and I have both met him, and rate him high), who is getting married, and wants to locate to Los Angeles for a year while his fiance/wife completes a Ph.D. at some school there. The UK DTI will keep paying him, so he is effectively free to us. They want a relevant job/work experience for him. Ian does not know about his willingness to commute during the week from San Francisco to LA (I told Ian we were receptive to these kinds of things, if all else worked out), but will check. I think it would be good for Enron (Paul D. may have views on this), not only for endearing Enron to key relationships at DTI, but exposing a UK civil servant to the transparency of our regulation, US-style, cannot hurt either, as that is something Paul is on a long march to improve in the UK. I would think challenging research, attendance at settlement conferences, some memo writing, etc. would be sufficient (actually, that would be a bit below the policy-formation role he now occupies), but do you have any thoughts? I can get his CV when you need it. thanks mcs A graph of the reply-to relationships can then be constructed as shown in FIG. 4. The reply-to relationships between participants may be used to isolate contextually linked emails. The graph allows users to clearly see the connectivity of different email nodes thereby illuminating different contextual streams within a single email thread. This leads to better question answering and also disentangles the thread so as to promote better visualizations, better understanding of inter-personal dynamics within email threads, and a clearer view of the flow of information.

Figure 5:
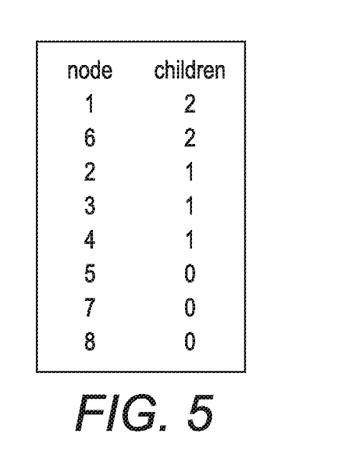
FIG. 5 shows an example conversation node list in accordance with embodiments described herein.

A number of children for each ranked node is determined 350. The ranked nodes are sorted 360 based on the determined number of children. The ranked nodes are sorted 370 reverse chronologically. A ranked conversation node list is constructed based on the sorting as shown in FIG. 5. At least one answer to the question is produced 390 using the conversation node list.

Figure 6:
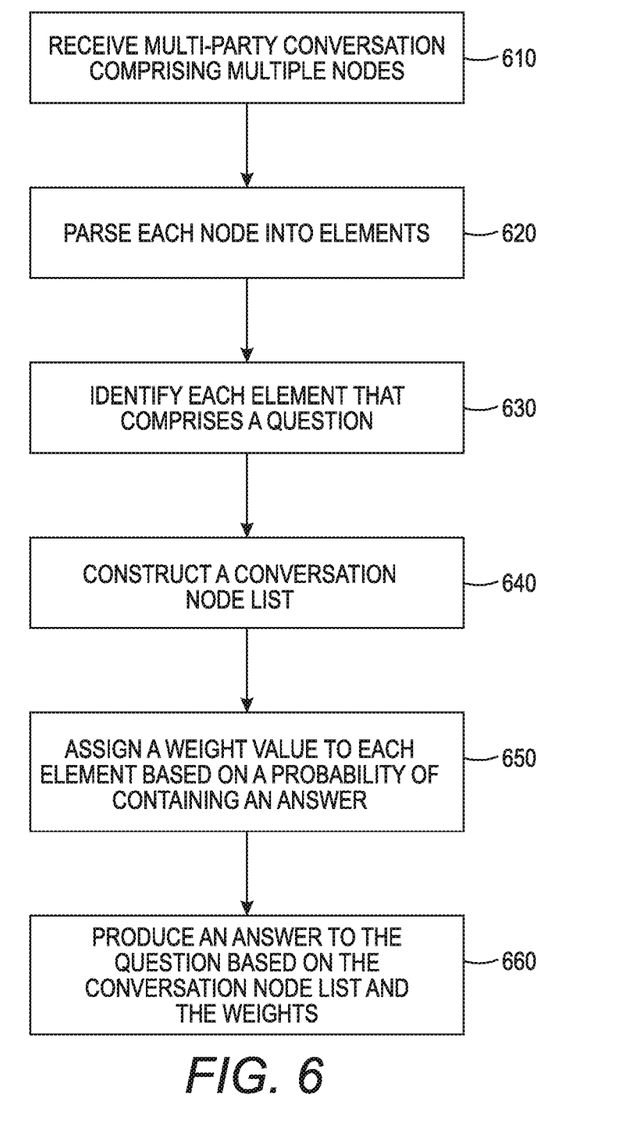
FIG. 6 illustrates another process for determining an answer to a question posed in a multi-party conversation in accordance with embodiments described herein.

FIG. 6 illustrates another process for determining an answer to a question posed in a multi-party conversation in accordance with embodiments described herein. A multi-party conversation comprising multiple nodes of unstructured natural language is received 610. Each node is parsed 620 into a plurality of elements. Each element of the plurality of elements that comprises a question is identified 630. A conversation node list that identifies relationships between the conversation elements is constructed 640. According to various embodiments, the conversation node list is passed to a deep learning module to determine the answer to the question. The deep learning module may assign 650 a weight value to each element based on a determined probability the respective element of containing an answer to the question. The answer to the question is produced 660 based on the conversation node list and the weights.

Figure 7:
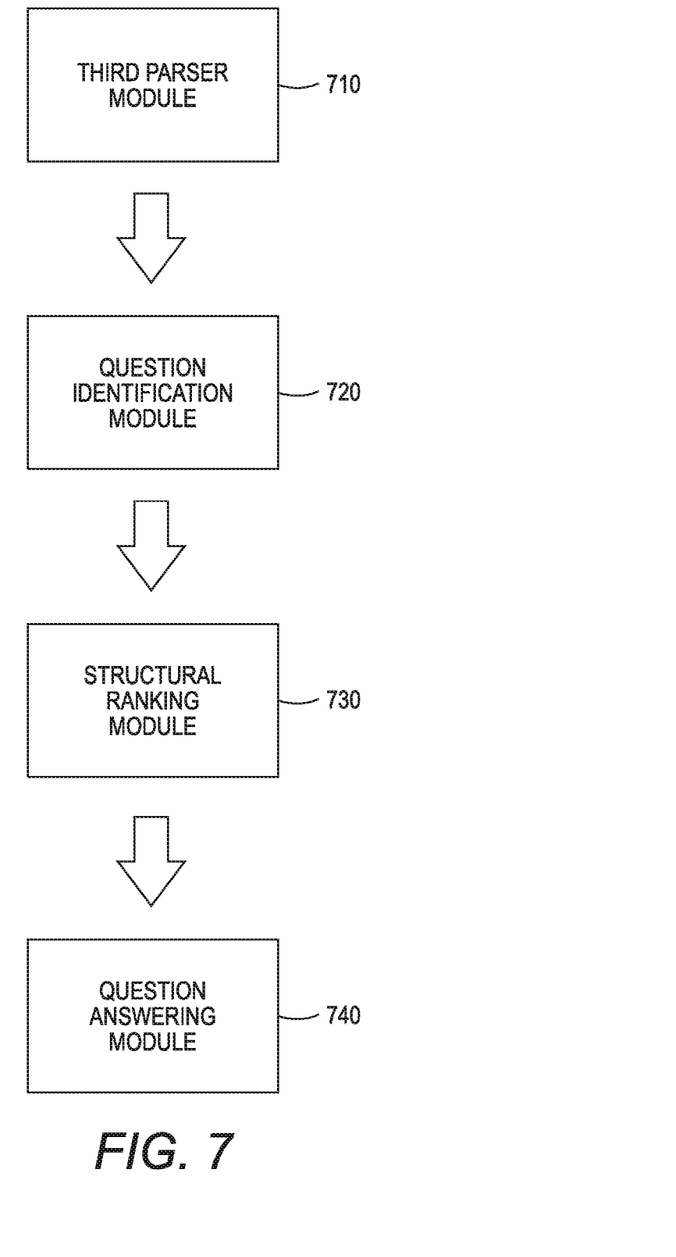
FIG. 7 shows a system having four modules that operate on the data in series in order to provide an answer to a question posed in a multi-party conversation in accordance with embodiments described herein.

The question answering system may include one or more modules that do various functions. FIG. 7 shows a system having four modules that operate on the data in series. According to various configurations, at least one of the modules may operate at least partially in parallel with at least one other module. After a multi-party conversation has been received as described in conjunction with FIG. 1, a thread parser module 210 clears out all irrelevant metadata and standardizes the format of messages. Irrelevant metadata such as header information and/or signatures may be removed using natural data language techniques. The standardized messages and relevant metadata may be stored in a data frame.

A question identification module 720 is configured to identify questions within the standardized messages. The question identification process comprises breaking down the text into language elements such as sentences. The question identification module 720 may use a pre-built hierarchical deep learning classifier that is trained using multi-party conversations. For example, the deep learning classifier may be trained using transcripts of telephone conversations between different groups of people, to classify sentences.

Once it has been determined that a conversation element includes a question, the question identification module may be configured to categorize the question into a question type. For example, the question may be categorized into at least one of four types of questions: rhetorical, 'Wh'-type (When, Where, Who, What, Why, How), Open-ended or Yes/No. Going back to the email example, open-ended and Yes/No. Questions posed in an email tend to be more conversation focused, with a majority of them being categorized as 'Yes/No' or 'Wh'. One or more types of questions may be ignored. For example, irrelevant, rhetorical, and/or open-ended questions obtained from the hierarchical model may be ignored. Once this is done, all questions of interest have been identified.

Once the questions of interest have been identified, a structural ranking module 730 may be used to construct a conversation node list. This may be done by iteratively selecting each email node that has an identified question in it and pass the node's chronological position over to the structural ranking module 730. A graph of the reply-to relationships in the email thread is constructed. This is done for every email node by looking at the list of recipients and connecting the node to the most recent email prior to the current one that is from a person in that list. Starting with the question node, the connected subgraph of emails is identified and thus a truncated version of the email that is more contextually homogenous is created. The structural ranking module then determines the number of children for each node in the subgraph and sorts the list of nodes first by the number of children and then sorts reverse chronologically by node position to get the final ranked node list.

The question answering module 740 receives the ranked node list from the structural ranking module. A deep learning question answering module 740 then uses the ranked node list to answer the question. The deep learning question answering module may use the concept of style transfer. This may be done by training deep bi-directional attention models on similar multi-party thread data containing questions and answers. The trained model may then be used to predict answers to questions asked in email threads. For example, the deep learning question answering module 740 may be trained using a community thread dataset containing questions and annotated answers. The dataset may include a range of quality of possible questions and/or answers. The bidirectional transformer within this attention model identifies which parts of the sentence to weight more as compared to the rest of the sentence, which helps improve the accuracy of the model.

The model produces a probability score of whether the sentence contains an answer. The probability scoring knowledge is used on the set of email containing questions and possible content containing answers. According to various configurations, for every question-sentence pair, surrounding context to the sentence from the email is used to improve performance. The probability scores may be used to help rank answers and/or obtain the best answers with a cut-off probability score. For example, the system may determine a probability score for potential answers to a question. A predetermined number of potential answers may be provided based on ranked answers that have the best chance of containing an answer to the question. According to various embodiments, only answers that have a probability score that is greater than or equal to a predetermined threshold are provided as potential answers to the question. The threshold probability score and/or the number of answers provided may be changed by the user in some embodiments.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate ink jet ejector diagnostics as described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A computer-implemented method for determining an answer to a question in a multi-party conversation, comprising:
   receiving a multi-party conversation comprising multiple nodes of unstructured natural language;
   parsing each node into a respective plurality of conversation elements;
   identifying each element of the respective plurality of elements that comprises a respective question;
   constructing a conversation node list that identifies relationships between nodes; and
   producing at least one answer to the respective question based on the conversation node list.

2. The method of claim 1, wherein constructing the conversation node list comprises:
   selecting each node that comprises a question; and
   ranking the selected nodes based on chronological position.

3. The method of claim 2, further comprising constructing a graph of reply-to relationships in the multi-party conversation for each ranked node.

4. The method of claim 3, further comprising:
   determining a respective number of children for each ranked node; and
   sorting the ranked nodes based on the respective number of children determined for each ranked node.

5. The method of claim 4, further comprising sorting the ranked nodes reverse chronologically by node position.

6. The method of claim 1, further comprising producing at least one answer to the respective question comprises using a deep learning module.

7. The method of claim 6, further comprising training the deep learning module using a community thread dataset comprising questions and annotated answers.

8. The method of claim 1, further comprising assigning a respective weight value to each element, the respective weight value based on a probability of containing an answer.

9. The method of claim 1, further comprising producing at least one answer to the respective question based on contextual information surrounding the respective question.

10. The method of claim 1 further comprising, for each element that has been identified as comprising the respective question, determining a respective question type.

11. The method of claim 10 wherein producing at least one answer to the respective question is based on the respective question type.

12. A system for determining an answer to a question in a multi-party conversation, comprising:
    a processor; and
    a memory storing computer program instructions which when executed by the processor cause the processor to perform operations comprising:
      receiving a multi-party conversation comprising multiple nodes of unstructured natural language;
      parsing each node into a respective plurality of conversation elements;
      identifying each element of the respective plurality of elements that comprises a respective question;
      constructing a conversation node list that identifies relationships between nodes; and
      producing at least one answer to the respective question based on the conversation node list.

13. The system of claim 12, wherein the processor is configured to:
    select each node that comprises a question; and
    rank the selected nodes based on chronological position.

14. The system of claim 13, wherein the processor is configured to construct a graph of reply-to relationships in the multi-party conversation for each ranked node.

15. The system of claim 14, wherein the processor is configured to:
    determine a respective number of children for each ranked node; and
    sort the ranked nodes based on the respective number of children determined for each ranked node.

16. The system of claim 15, wherein the processor is configured to sort the ranked nodes reverse chronologically by node position.

17. The system of claim 12, wherein the processor is configured to produce at least one answer to the respective question using a deep learning module.

18. The system of claim 17, wherein the deep learning module is trained using a community thread dataset comprising questions and annotated answers.

19. The system of claim 12, wherein the processor is configured to assign a respective weight value to each element, the respective weight value based on a probability of containing an answer.

20. A non-transitory computer readable medium storing computer program instructions for determining an answer to a question in a multi-party conversation, the computer program instructions when executed by a processor cause the processor to perform operations comprising:
- receiving a multi-party conversation comprising multiple nodes of unstructured natural language;
- parsing each node into a plurality of conversation elements;
- identifying each element of the respective plurality of elements that comprises a respective question;
- constructing a conversation node list that identifies relationships between nodes; and
- producing at least one answer to the respective question based on the conversation node list.

* * * * *